US008244062B2

(12) United States Patent
Dey et al.

(10) Patent No.: US 8,244,062 B2
(45) Date of Patent: Aug. 14, 2012

(54) CORRECTION OF DISTORTION IN CAPTURED IMAGES

(75) Inventors: Prasenjit Dey, Bangalore (IN); Anbumani Subramanian, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 996 days.

(21) Appl. No.: 12/234,719

(22) Filed: Sep. 22, 2008

(65) Prior Publication Data

US 2009/0103808 A1 Apr. 23, 2009

(30) Foreign Application Priority Data

Oct. 22, 2007 (IN) .......................... 2388/CHE/2007

(51) Int. Cl.
*G06K 9/36* (2006.01)
(52) U.S. Cl. ....... 382/276; 382/274; 382/275; 358/3.26; 358/3.27
(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 5,557,689 A | * | 9/1996 | Huttenlocher et al. | 382/177 |
| 5,640,466 A | * | 6/1997 | Huttenlocher et al. | 382/177 |
| 5,687,253 A | * | 11/1997 | Huttenlocher et al. | 382/177 |
| 6,005,681 A | * | 12/1999 | Pollard | 358/473 |
| 6,144,778 A | * | 11/2000 | Beauchamp et al. | 382/318 |
| 6,249,360 B1 | * | 6/2001 | Pollard et al. | 358/473 |
| 6,249,604 B1 | * | 6/2001 | Huttenlocher et al. | 382/174 |
| 6,611,598 B1 | * | 8/2003 | Hayosh | 380/54 |
| 6,873,732 B2 | | 3/2005 | Dance | |
| 6,947,610 B2 | | 9/2005 | Sun | |
| 7,438,231 B2 | * | 10/2008 | Cordery et al. | 235/462.01 |
| 2002/0041717 A1 | | 4/2002 | Murata et al. | |
| 2003/0086615 A1 | | 5/2003 | Dance et al. | |
| 2006/0140504 A1 | | 6/2006 | Fujimoto et al. | |
| 2006/0210192 A1 | | 9/2006 | Orhun | |

OTHER PUBLICATIONS

C. Monnier, V. Ablavsky, S. Holden, and M. Snorrason, "Sequential Correction of Perspective Warp in Camera-based Documents," Proceedings of ICDAR, Seoul, South Korea, pp. 394-398, Aug. 2005.
H. S. Baird, "Skew Angle of Printed Documents", Proc. of SPSE's 40th Annual Conference and Symposium on Hybrid Imaging Systems, Rochester, NY, pp. 21-24, 1987.
L. Jagannathan and C. V. Jawahar, "Perspective Correction Methods for Camera-Based Document Analysis", Proceedings of CBDAR, Aug. 2005.
M. Pilu, "Extraction of illusory linear clues in perspectively skewed documents", IEEE Computer Vision and Pattern Recognition Conference, Kauai, HI, pp. 363-368, Dec. 2001.
M. Pilu, S. Pollard, "A light-weight text image processing method for handheld embedded cameras", British Machine Vision Conference, Sep. 2002.
M. Pilu, "Undoing Page Curl Distortion Using Applicable Surfaces", IEEE Computer Vision and Pattern Recognition Conference, Kauai, HI, pp. 67-72, Dec. 2001.
P. Clark, M. Mirmehdi, "Estimating the Orientation and Recovery of Text Planes in a Single Image", British Machine Vision Conference, 2001.
P. Clark, M. Mirmehdi, "On the Recovery of Oriented Documents from Single Images" Proceedings of ACIVS, Ghent, Belgium, Nov. 2001.
Tesseract OCR, http://sourceforge.net/projects/tesseractocr.

* cited by examiner

Primary Examiner — Yosef Kassa

(57) ABSTRACT

An image processing method comprises analyzing an image of a portion of text, and detecting the inter-line spacing and the inter-word spacing across the area of the image. Based on the inter-line and inter-word spacings, a quadrilateral shape is derived which represents the deformation of the text image from an undistorted image. The image is modified to perform perspective correction based on the derived quadrilateral.

10 Claims, 7 Drawing Sheets

FIG. 7b green or blue pixel in the raw mosaic (shown expand
Figure 2), the corresponding pixel in the HiPass
it a corresponding low pass red green or blue
plane of the mosaic. This is then corrected to rem
ndard gradient-based interpolation schemes outl
at is derived from a red or blue pixel is co
the row of 5 neighboring pixels in the
the lower intensity gradient. The interpolat
where I and C are the intensities of the
The corrected HiPass mosaic is then ad
fully reconstructed image.

FIG. 8a green or blue pixel in the raw mosaic (shown expand
Figure 2), the corresponding pixel in the HiPass
it a corresponding low pass red green or blue
plane of the mosaic. This is then corrected to rem
ndard gradient-based interpolation schemes outl
at is derived from a red or blue pixel is co
the row of 5 neighboring pixels in the
the lower intensity gradient. The interpolat
where I and C are the intensities of the
The corrected HiPass mosaic is then ad
fully reconstructed image.

CORRECTION OF DISTORTION IN CAPTURED IMAGES

RELATED APPLICATIONS

Benefit is claimed under 35 U.S.C. 119(a)-(d) to Foreign application Ser No. 2388/CHE/2007 entitled "CORRECTION OF DISTORTION IN CAPTURED IMAGES" by Hewlett-Packard Development Company, L.P., filed on 22Oct. 2007, which is herein incorporated in its entirety by reference for all purposes.

BACKGROUND OF THE INVENTION

The invention relates to the correction or reduction of distortion in captured images, for example images captured by a camera. In particular it relates to the correction of distortion for text images, which may be subsequently subjected to electronic character recognition.

The immense proliferation of hand-held devices with cameras in the present consumer market naturally invokes an interest to utilize these cameras for diverse applications at times not originally intended.

One such application is the use of such cameras for document imaging and thereby pushing the limits of the device to replace document scanners.

Due to the limited optics present in hand-held cameras, the captured images of documents exhibit perspective and some radial distortions. In addition, the images appear mostly skewed. These pose severe problems to a document processing system for handheld camera images, and hence significantly decrease the performance of the system.

There has been some interest towards the problem of perspective correction for document images in the past. Most approaches proposed extract illusory perspective cues in document images and use these cues to rectify the perspective distortion in the document image. Although these methods do not require a complete view of the document, they assume ends of the justified text to be present in the view.

The known approaches are therefore often not satisfactory for perspective correction when the image does not have a complete view of the printed lines but has only a partial view of the page. In a partial view, the ends of the printed lines may not be visible and so perspective cues can not be easily obtained from the image.

BRIEF DESCRIPTION OF THE DRAWINGS

Examples of the invention will now be described in detail with reference to the accompanying drawings, in which:

FIGS. 4 and 5 shows a skew correction step used in the method of FIG. 3;

FIGS. 7a and 7b show a first example of image before and after correction;

FIGS. 8a and 8b show a second example of image before and after correction; and

FIGS. 9a and 9b show a third example of image before and after correction.

DETAILED DESCRIPTION

Examples of the invention provide an image processing method in which an image is analysed to detect the inter-line spacing and inter-word spacing of text, at samples across the area of the image. Based on the inter-line and inter-word spacings, a quadrilateral shape is derived which represents the deformation of the text image from an undistorted image. The image is modified to perform perspective correction based on the derived quadrilateral.

In the description below, it is assumed that the inter-word spacing in a document is approximately fixed. Also, for most practical camera imaging of documents, the users capture an image of the document as they read it, namely with text running horizontally from left to right in front of the camera. This leads to a vanishing point in the image which is perpendicular to the flow of the text (i.e. at the top or bottom of the page).

Figures 1A, 1B:
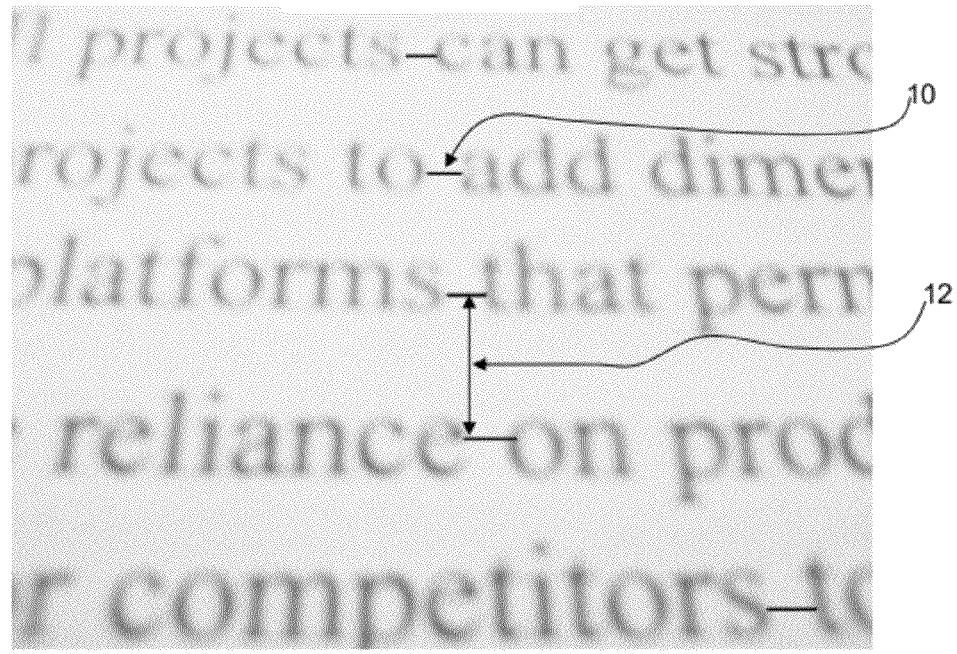
FIGS. 1a and 1b show how an image can become distorted by the image capture process.

FIG. 1(a) shows a normal portion of a text image, and which does not include line edges. FIG. 1(b) shows an example of a perspective distorted image. In the distorted image, the inter-word spacing is shown as 10 and the inter-line spacing is shown as 12.

Figure 2:
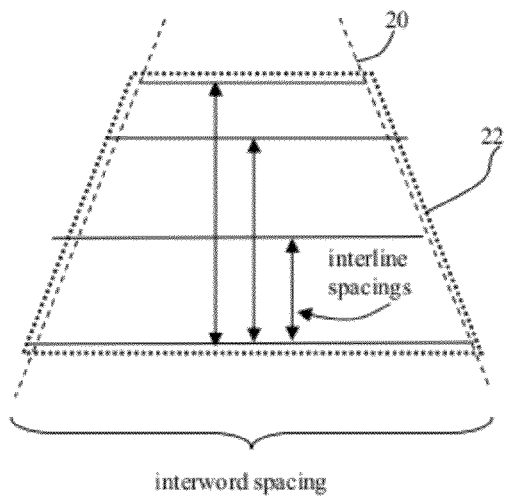
FIG. 2 shows how the distortion can be represented by a quadrilateral.

When there is perspective distortion, with the vanishing point perpendicular to the text flow as shown in FIG. 1(b), the inter-word spacing and inter-line spacings are distorted. The detection of these distorted inter-word spacings ($S_W$) at various inter-line spacings ($S_L$) can enable a distortion quadrilateral to be derived as shown in FIG. 2.

The method/algorithm for generating the distortion quadrilateral and using this for perspective correction is explained with reference to FIG. 3.

Figure 3:
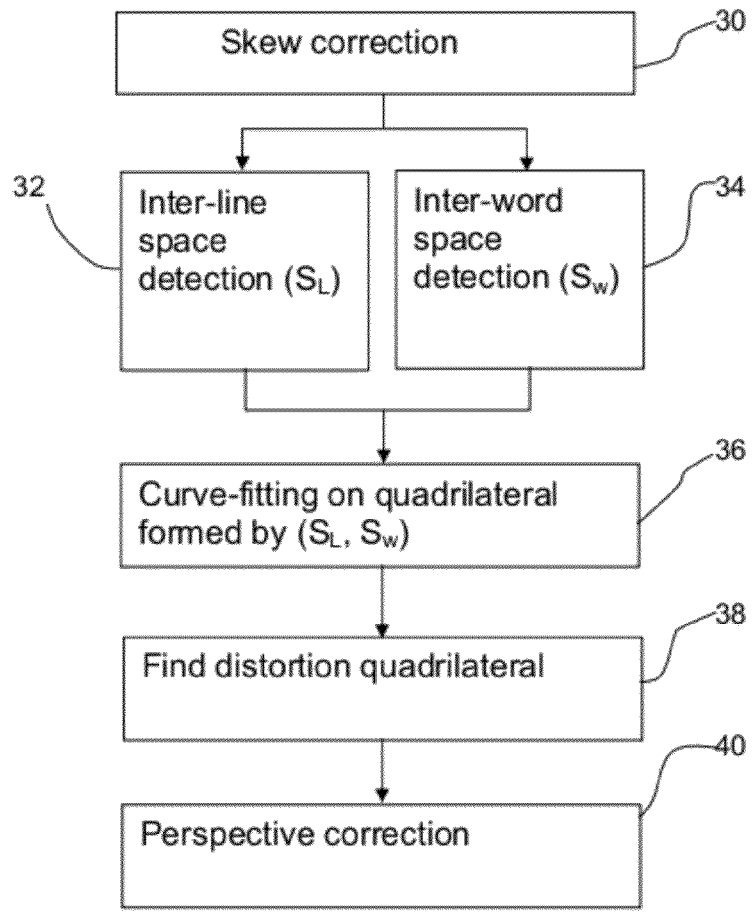
FIG. 3 shows the schematic of method of the invention.

As shown in FIG. 3, the method comprises skew correction 30, inter-line space detection 32, inter-word space detection 34, and curve-fitting 36 onto a quadrilateral based on the spacings. This curve fitting results in a distortion quadrilateral in step 38, so that perspective correction can be carried out in step 40.

The steps of the method are discussed in turn below.

Skew Correction

Figures 4, 5:
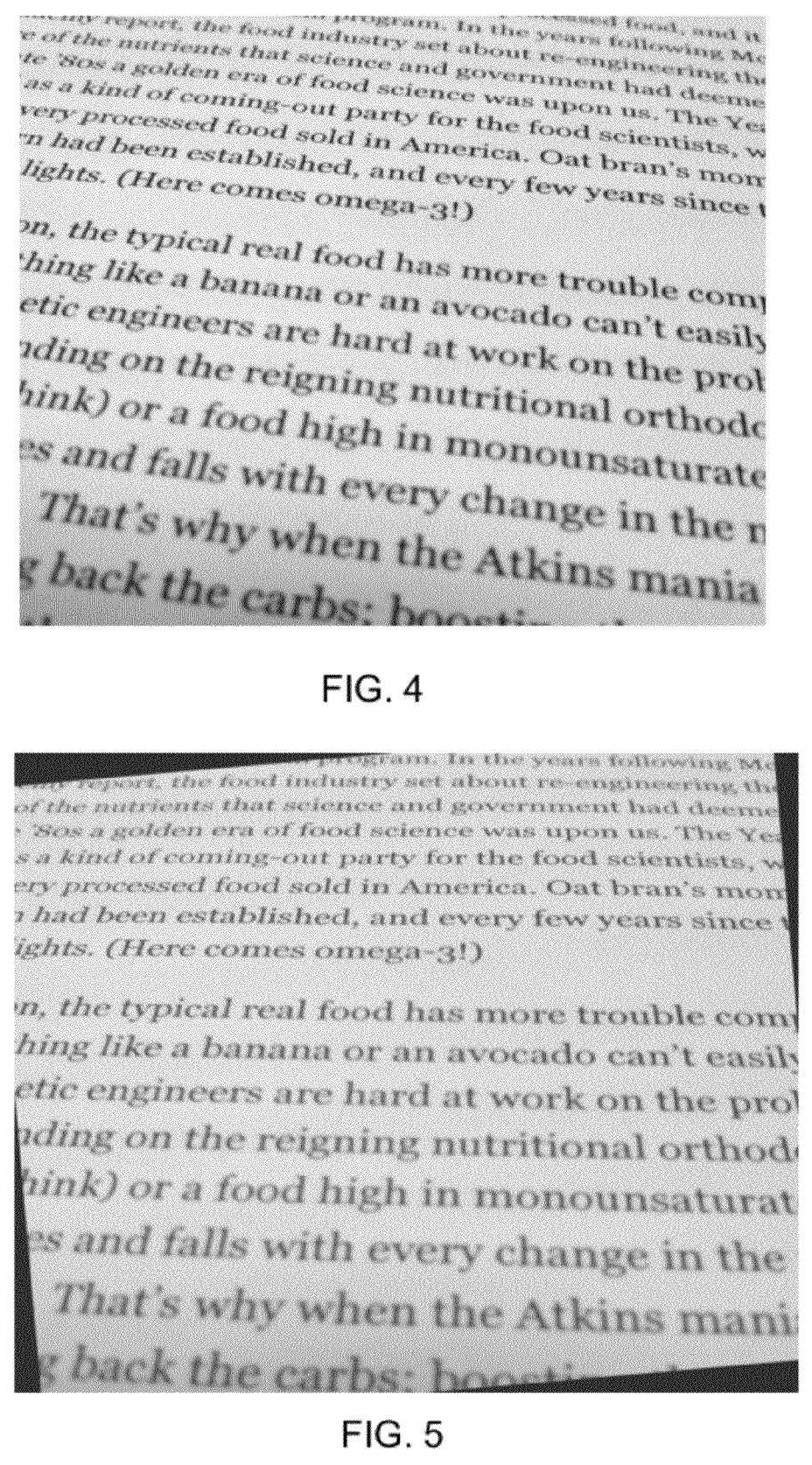

For most examples of image capture using a camera, the text flow appears skewed due to the user's camera angle. An image with skew is shown in FIG. 4. Before the text in an image can be analyzed to extract spacing information, the image needs to be corrected for skew.

There are many image analysis techniques which can be used to detect the direction of lines within the image. One example is to use an 8-neighbor connected component approach on the binarized image of the input.

The 8-neighbor connected component analysis is a standard technique in image processing used to group the black (or white) pixel areas, so that they form contiguous regions in the image.

The bounding box of each component in the image can then be found. The centroids of these connected components are used in a Hough transform analysis to determine the skew angle of the document.

Hough transform is a well-known technique used in image analysis to identify straight lines in an image. In this method, the two-dimensional spatial content in an input image is transformed in to a radius-angle (Hough) space, whose analysis infers the presence of lines in the input image.

The input image is then rotated to correct the skew as shown in FIG. 5.

This skew correction thus comprises a rotation to provide lines of text in a horizontal direction.

Inter-line Space Detection

The de-skewed document image is then analyzed to determine the number of printed lines in view, using a horizontal projection profile based approach.

Projection profile of an image involves counting the number of black (or white) pixels along its horizontal or vertical direction. For a text image, horizontal projection profile analysis is equivalent to counting the number of black pixels along every row. The profile count is an integer value for every row in an image, with a minimum of value 0 and maximum of the pixel width of the image. This is a popular technique widely used in image analysis for skew detection.

An example of this process is described in the article "Skew Angle of Printed Documents", Proc of SPSE's 40th Annual Conference and Symposium on Hybrid Imaging Systems, Rochester, N.Y., pp 21-24, 1987.

This yields the start and end locations of printed lines along the vertical direction of the image, and hence the boundaries of each line segment. The vertical boundaries in turn give the inter-line spacings ($S_L$).

Inter-Word Space Detection

After finding the line boundaries, a vertical projection profile analysis is carried out for each line segment.

Vertical projection profile is the same as horizontal projection profile described earlier except that the direction of pixel counting is along the vertical (i.e., for every pixel column of the image).

Based on these vertical projection profiles, the printed text and non-text areas in a line are identified. By empirically choosing some threshold parameters for the vertical projection profile, it is possible to find the word boundaries. This analysis gives the length of all inter-word spacings in a line. Of these identified inter-word spacings in the line, the one which is nearest to the center of the image is selected to avoid any effect of distortions that occur near the image periphery.

Curve Fitting

From the image pre-processing above, the inter-word spacings and the inter-line spacings are available for use in perspective correction.

The inter-word spacing values may have noise due to errors in detection of the word boundaries, and due to different character widths resulting in small changes in inter-word spacing. To overcome these noise issues, a best-fit linear curve is found through the edges of the inter-word spacings to derive the sides of the quadrilateral. These are shown as the dotted edges 20 in FIG. 2.

Distortion Quadrilateral

A distortion quadrilateral is constructed based on the these parameters, as shown as 22 in FIG. 2.

In FIG. 2, each horizontal line represents the inter-word spacing at the centre of each row of text. These lines are spaced vertically by distances corresponding to the inter-line spacing.

The resulting quadrilateral shape represents the way the original image has been distorted, as it is assumed that the inter-line and inter-word spacings are constant in the original document.

The curve fitting outlined above also enables individual erroneous measurements to be discarded, which can otherwise distort the whole quadrilateral into a form totally different from the correct shape. The distortion quadrilateral represents the perspective distortion the image has suffered.

Perspective Correction

Once the distortion quadrilateral is obtained, it is mapped to a rectangle with an appropriate aspect ratio (i.e the original proportions of the image on a rectangular page).

An aspect ratio can be assumed, for example $1/\sqrt{2}$ which is the aspect ratio of A4 paper. This assumption can be the starting point for a trial and error approach, and may need to be changed for different aspect ratio images.

Figure 6:
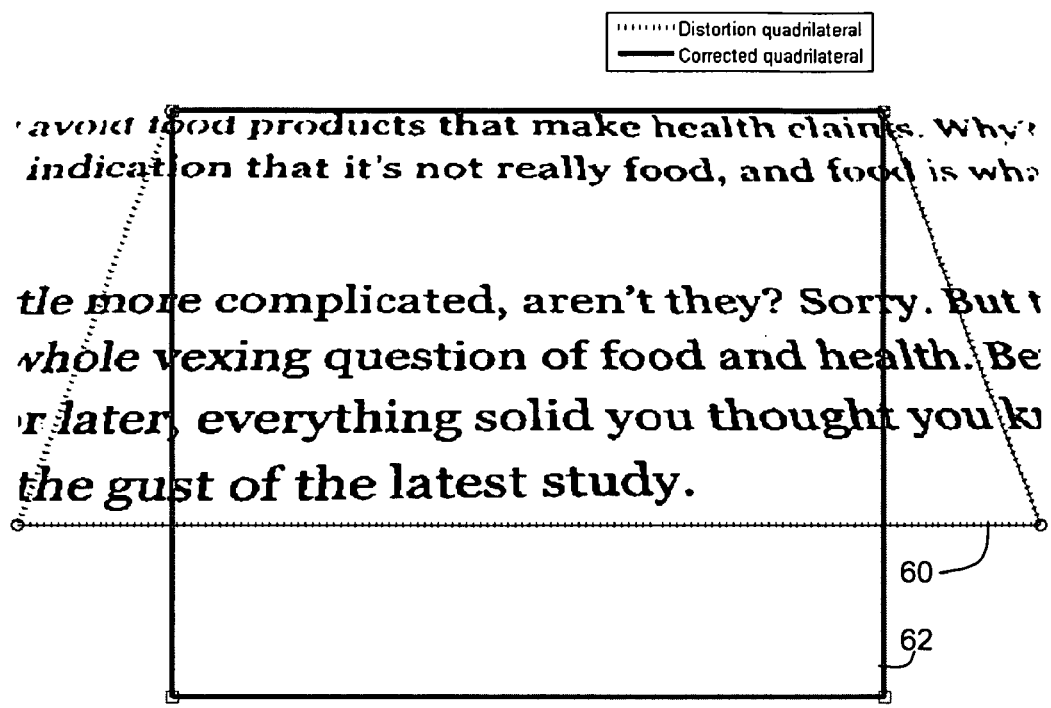
FIG. 6 shows how a quadrilateral is used to transform the image.

An example of a detected distortion quadrilateral 60 and the corresponding target rectangle 62 with a chosen aspect ratio is shown in FIG. 6. This mapping enables the corrected image to be obtained from the distorted image with the same parameters that transform the distortion quadrilateral to a rectangle with the chosen aspect ratio.

Figures 7A, 7B:
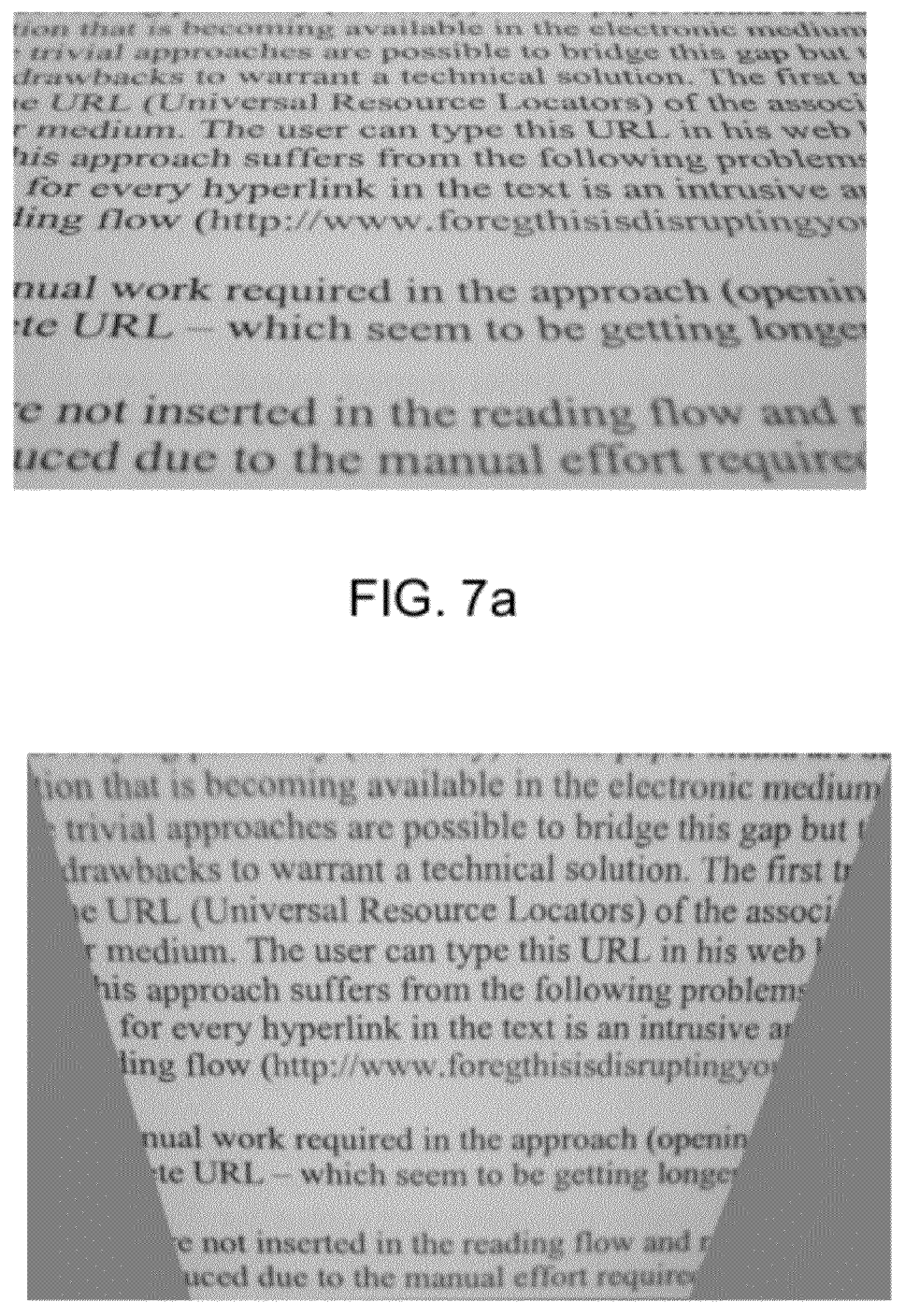
Figures 9A, 9B:
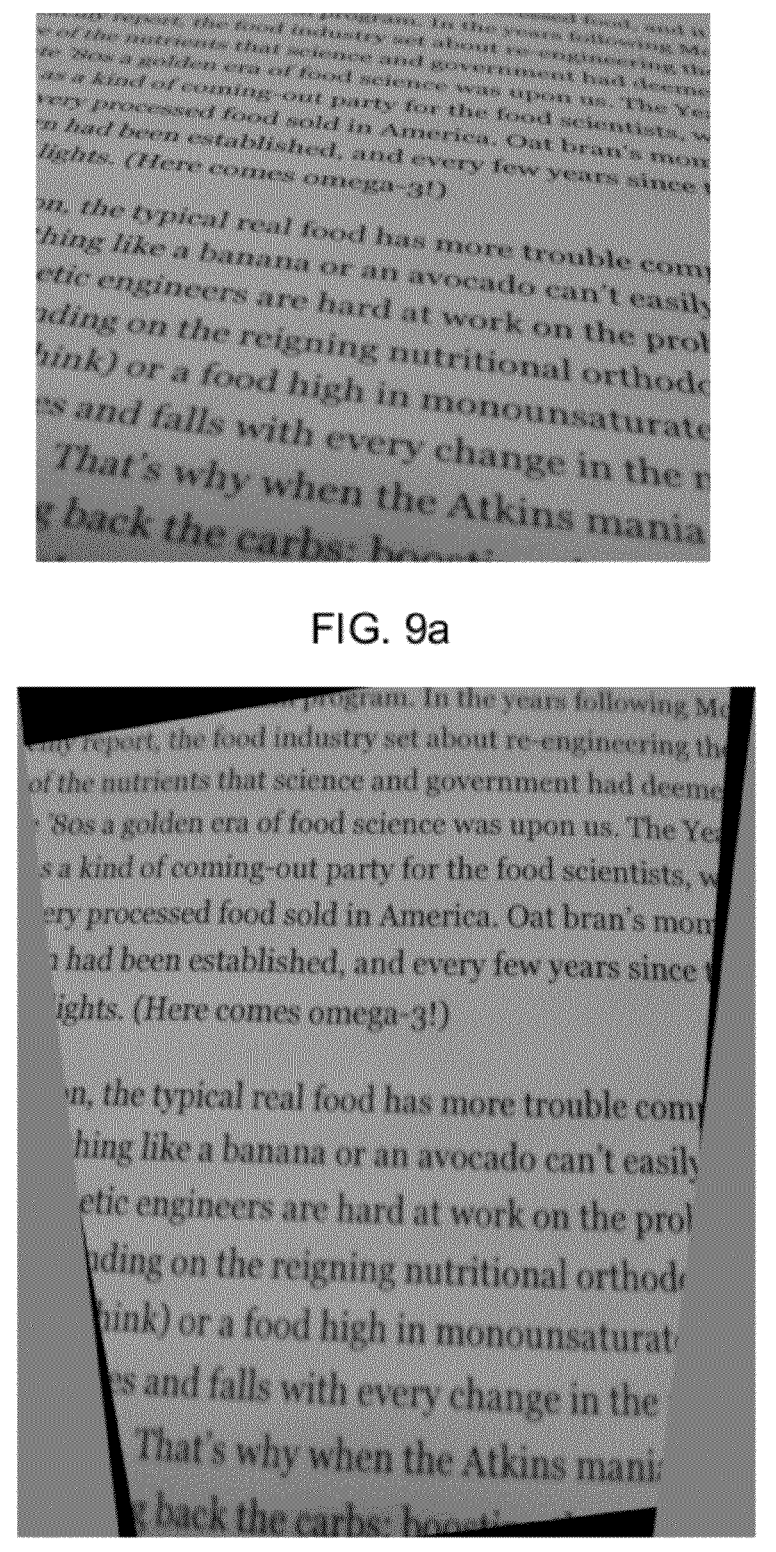

FIGS. 7 to 9 show sample images and their corresponding perspective corrected images using the approach explained above. In each case, the captured image is shown as FIG. "a" and the corrected image is shown as FIG. "b".

The perspective correction of a camera document image is highly sensitive to the detection of vanishing points and the assumption of the aspect ratio. In the absence of any other cue from the image, the corrected image quality may suffer if the inter-word spacing and the inter-line spacing could not be detected properly due to bad focus or poor lighting conditions (low contrast or brightness).

The method above provides a way to automatically correct perspective distortion for document images with partial view of the text area, and the presence of only one vanishing point.

The benefits of the approach explained above have been verified by applying character recognition to the corrected images. In general, the OCR results on the corrected image are significantly better than those from the original image.

The method described above can be implemented as a computer program to perform the image processing functions. Thus, an apparatus for implementing the invention can comprise a computer which processes a digital image file to perform the image analysis and subsequent correction.

In the example above, it is assumed that all of the text is the same size, and therefore has the same word and line spacing. If there are different portions of text within an image, the image analysis can differentiate between them, so that one set of data is used to derive the perspective correction. User input may also be enabled to select a portion of text to which the image processing is to be applied.

The method has been described above in connection with images captured by a hand held camera. However, the image processing can be applied to images of text which have been distorted by other image capture devices (for example CCTV cameras).

The method uses multiple measurements of inter-word and inter-line spacing, but these do not need to cover the full image. The image processing thus may analyse all lines within a captured image, but this is not essential.

Only one example of each of the different types of image processing have been given. Those skilled in the art will be aware that many different image processing techniques are available for detecting patterns within images, and of course text is simply an image pattern. Thus, there are many different processes for detecting which parts of an image are text and which are background, and deriving the inter-word and inter-line spacing is then a routine matter. For example, inter-word and inter-line spacings can also be obtained using any of several image analysis techniques such as connected components labelling, morphological operators, region growing methods.

Those skilled in the art can thus appreciate that there are many ways to implement the analysis of inter-word and inter-line spacings to correct perspective distortion as described above.

While specific embodiments have been described herein for purposes of illustration, various modifications will be apparent to a person skilled in the art and may be made without departing from the scope of the invention.

We claim:

1. An image processing method comprising:
   analyzing, by an image processing apparatus, an image of a portion of text having at least one line;
   detecting, by the image processing apparatus, inter-line spacing and inter-word spacing across an area of the image;
   based on the detected inter-line spacing and the inter-word spacing, deriving a quadrilateral shape, the quadrilateral shape representing a deformation of the image from an undistorted image; and
   modifying, by the image processing apparatus, the image to perform perspective correction based on the derived quadrilateral shape.

2. A method as claimed in claim 1, further comprising, before detecting the inter-line and inter-word spacing, performing an image rotation for skew correction.

3. A method as claimed in claim 1, wherein detecting inter-line spacing comprises determining a number of lines and detecting a start and end locations of the lines along a vertical direction of the image.

4. A method as claimed in claim 3, wherein detecting inter-line spacing comprises using a horizontal projection profile analysis.

5. A method as claimed in claim 1, wherein detecting inter-word spacing comprises detecting text and non-text areas in each line and determining word boundaries.

6. A method as claimed in claim 5, wherein detecting inter-word spacing comprises using a vertical projection profile analysis.

7. A method as claimed in claim 1, wherein deriving a quadrilateral shape comprises defining quadrilateral sides using a best fit approach to a set of inter-word spacing values.

8. A method as claimed in claim 1, further comprising performing character recognition on the modified image.

9. A non-transitory computer readable medium comprising computer program code that when executed by a computer, causes the computer to:
   analyze an image of a portion of text having at least one line;
   detect inter-line spacing and inter-word spacing across an area of the image;
   derive a quadrilateral shape based on the inter-line spacing and the inter-word spacing, the quadrilateral shape representing a deformation of the image from an undistorted image; and
   modify the image to perform perspective correction based on the derived quadrilateral Shape.

10. An image processing apparatus comprising:
    means for analyzing an image of a portion of text, the image defining an area, and detecting inter-line spacing and inter-word spacing across the area of the image;
    means for deriving a quadrilateral shape, the quadrilateral shape representing a deformation of the image from an undistorted image based on the inter-line spacing and the inter-word spacing; and
    means for modifying the image to perform perspective correction based on the derived quadrilateral shape.

* * * * *

UNITED STATES PATENT AND TRADEMARK OFFICE
CERTIFICATE OF CORRECTION

PATENT NO. : 8,244,062 B2  
APPLICATION NO. : 12/234719  
DATED : August 14, 2012  
INVENTOR(S) : Prasenjit Dey et al.

It is certified that error appears in the above-identified patent and that said Letters Patent is hereby corrected as shown below:

In column 6, line 18, in Claim 9, delete "Shape." and insert -- shape. --, therefor.

Signed and Sealed this  
Fifth Day of February, 2013

Teresa Stanek Rea  
*Acting Director of the United States Patent and Trademark Office*